UNITED STATES PATENT OFFICE.

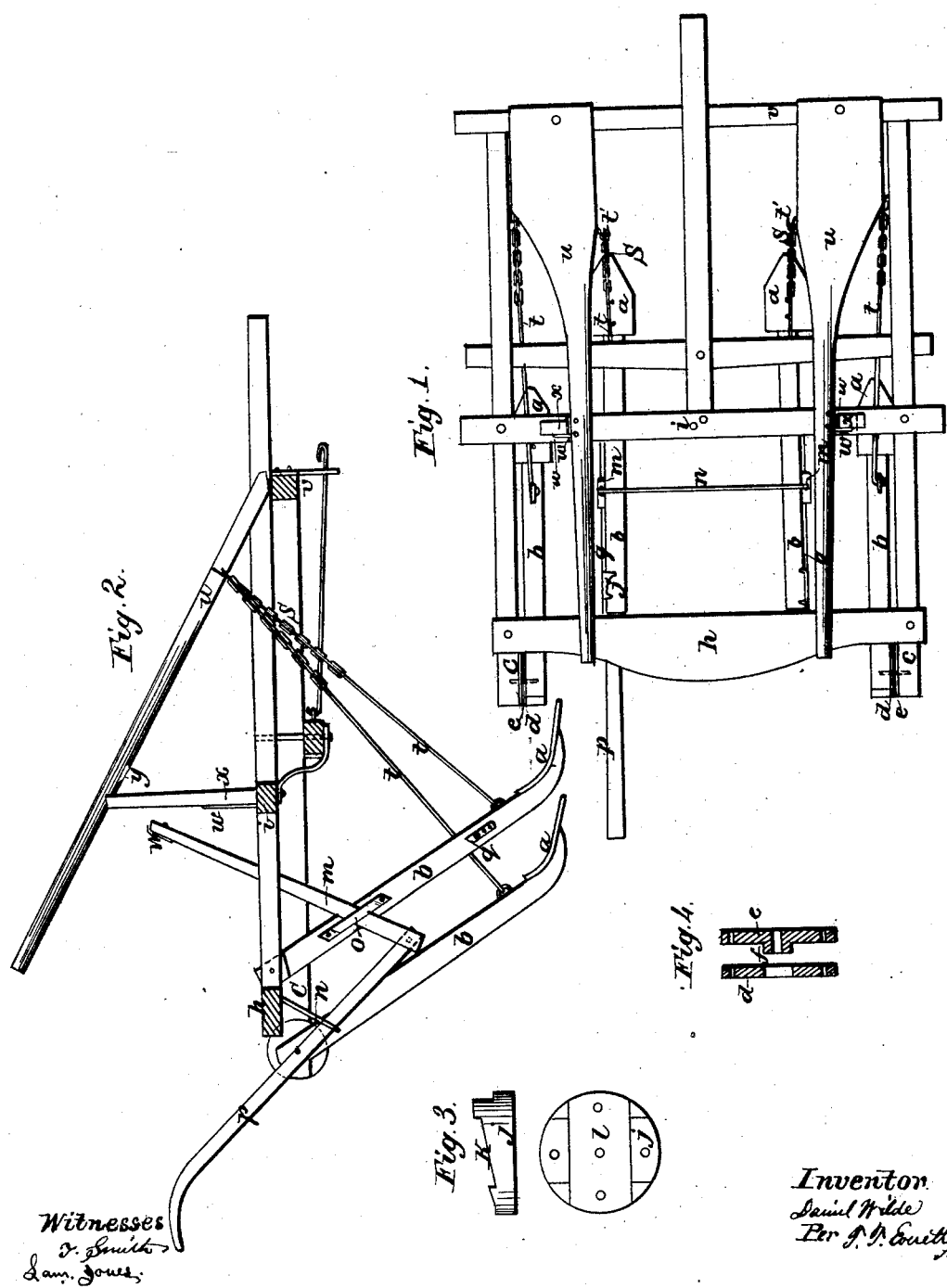

DANIEL WILDE, OF WASHINGTON, IOWA.

IMPROVEMENT IN CORN-CULTIVATORS.

Specification forming part of Letters Patent No. 45,549, dated December 20, 1864.

*To all whom it may concern:*

Be it known that I, DANIEL WILDE, of Washington, in the county of Washington and State of Iowa, have invented a certain new and useful Improvement in Corn-Cultivators; and I do hereby declare that the following is a full, clear, and exact description thereof, reference being had to the accompanying drawings, and to the letters and marks thereon.

The drawings forming part of this specification represent a corn-cultivator having my improvement, Figure 1 thereof being a top view, or a view had by looking down on the cultivator; Fig. 2 being a view by longitudinal section; Fig. 3, views of the inside joint-plate, and Fig. 4 a view by vertical or central section of the outside joint-plates.

In each of these figures, when like parts are shown, like marks and letters are used to designate the parts.

The shovels or teeth $a$ are attached to the stakes $b$ in the usual way. The upper ends of the outer stakes are connected to the frame-bars $c$ by a plate, $d$, Fig. 4, on the stake and a plate, $e$, on the bar, the central projection, $f$, of the plate $e$ fitting into the central hole of the plate $d$, thus affording a bearing of good surface and allowing easy and free motion. The two plates can be held together by a pin or bolt and nut passing through the central holes therein. The inner shovel-stakes are connected at their upper ends to a rocking or vibrating bar, $g$, which bar is pivoted at the one end to the seat $h$ and at the other end to the axle-tree $i$, the pivoting allowing the necessary motion to turn the shovels to the one side or the other. On the upper ends of the inner stakes are plates $j$, which, as shown by Fig. 3, have an inclined face, $k$, and a flat or horizontal face, $l$. These faces allow of the fitting of the end of the stake therein, so that the inside shovels can be set to run straight or to throw the earth to the corn or from it, according to whichever face is fitted to the end of the stake and the direction of the inclined face. The plates $j$, with a pin or bolt, form the joint connecting the inner stakes to the rocking bar $g$.

Attached to the rocking bar $g$ are elevated stakes $m$, connected at the top by a stretcher, $n$, and passing between the straps $o$ and the shovel-stakes, the straps being fastened to the stakes. A handle, $p$, is connected to the one elevated stake, so that the inner shovels may be controlled by it when the cultivator is used as a walking one, and the stirrups $q$ are affixed to the inner surfaces of the stakes, so that the feet of the driver may control the inner shovels when the cultivator is used as a riding one. The handle $p$ passes through and has play within a stirrup, $r$, extending down from the seat $h$.

The shovel-stakes are connected by chains $s$ and braces $t$ and hooks $t'$ to levers $u$, the front or forward ends of which have a free attachment to the front bar, $v$, of the frame. These levers can be supported near the middle by the notched iron plates $w$, secured to the upright bars $x$, tenoned to the axle-tree, the levers having iron plates $y$ to fit into the notches of the plates $w$, so that the shovels and stakes can be raised or lowered and adapted to run deeper or shallower in the ground, as may be desired. By placing the levers on the top of the uprights $x$ the shovels will be raised out of the ground.

What I claim as new, and desire to secure by Letters Patent, is—

1. The levers $u$, resting on the front bar of the frame and supported near the middle by the notched plates $w$, secured to the uprights $x$, and operating as and for the purposes herein recited.

2. The arrangement of the rocking bar $g$, elevated bar $m$ in relation to the handle, and the shovel-stakes, for the purpose herein set forth.

3. In connection with the arrangement of the rocking bar $g$, bar $m$, and the shovel-stakes, the stirrups $q$, for the purpose herein named.

4. The plate $j$, with its inclined and horizontal faces $k$ and $l$, for the purpose herein set forth.

This specification signed this 1st day of August, 1864.

DANIEL WILDE.

Witnesses:
CHAS. MCPHERSON,
JOHN WAGNER.